March 8, 1955  J. LANDIS  2,703,453

DENTAL MODEL SURVEYOR

Filed Nov. 24, 1953

INVENTOR.
Joseph Landis
BY Bolton O. St Palley
Patent Agent

United States Patent Office 2,703,453
Patented Mar. 8, 1955

2,703,453

DENTAL MODEL SURVEYOR

Joseph Landis, East Haven, Conn.

Application November 24, 1953, Serial No. 394,078

5 Claims. (Cl. 32—67)

My invention relates to improvements in dental model surveyors. The dental model surveyors are generally used for paralleling and analyzing the plaster model of dentures in order to determine the contour and the undercut of the teeth. This work is usually performed by placing the dental model tangentially to a vertically disposed analyzing pin and observing the gap between them. With the ordinary illumination the accuracy of this observation is often jeopardized by the shadow of the analyzing pin cast upon the surface of the dental model adjacent to the gap.

The principal object of my invention is to provide a dental model surveyor in which the disturbing effect of the shadow of the analyzing pin is eliminated by the use of a screen of diffused light in the back-ground of the gap observed, increasing thereby the accuracy of the observation.

Another object of my invention is to provide a dental model surveyor in which the Lucite element, producing the screen of diffused light, is adjustable in position with respect to the analyzing pin so as to obtain the best screen for the observation.

Another object of my invention is to provide a dental model surveyor in which the Lucite element, producing the screen of diffused light, is easily replaceable by elements of different shapes so as to obtain the most satisfactory screen under all conditions.

A further object of my invention is to provide a dental model surveyor in which the different analyzing pins, used in the work, are held in reserve near the point of observation so that any one can be lowered conveniently into the operating position and the Lucite element can be adjusted to produce equally satisfactory screen of diffused light in conjunction with any one of the analyzing pins used.

Other objects and advantages of my invention will be apparent during the course of the following description.

Figure 1:
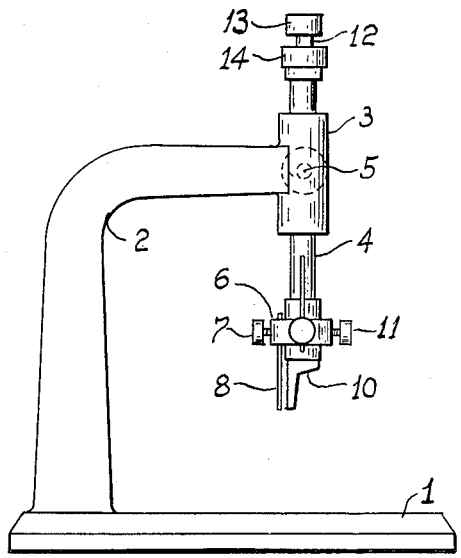
Figure 2:
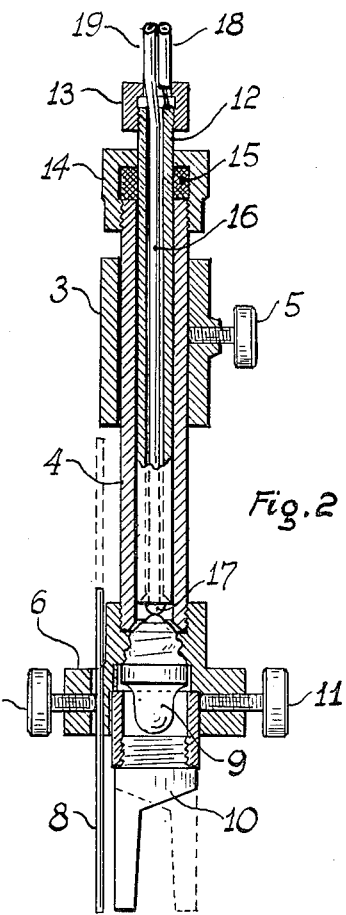
Figure 3:
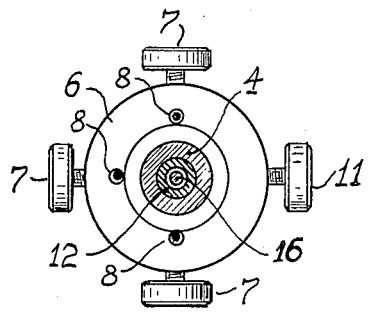

In the accompanying drawing, forming a part of this application, wherein, for the purpose of illustration, is shown a preferred embodiment of my invention, Figure 1 is a side view of the dental model surveyor, Figure 2 is a longitudinal sectional view of the spindle and the associated parts, Figure 3 is a cross-section of the spindle, showing also a plan view of the analyzing pin holder.

In the drawing, wherein like numerals are employed to designate like parts, in Fig. 1 the numeral 1 designates the base of the dental model surveyor, which is machined to give a flat surface for the deposition of the dental model. Attached to this base is the supporting stand 2, carrying a sleeve 3, having an axis perpendicular to the surface of said base 1. Slidably and rotatably mounted in said sleeve is a spindle 4, which can be secured in position by a clamping screw 5.

The spindle 4, illustrated in detail in Figs. 2 and 3, is tubular, and carries at its lower end the analyzing pin holder 6, whch is provided with screw clamps 7 for securing the analyzing pins 8. It is an essential feature of my invention that the several types of pins needed in the work are carried by said holder 6 in the reserve position, shown by the dotted lines in Fig. 2, and any one of them may be lowered into the operating position, shown by the full lines in the same figure. These analyzing pins have different forms and they may be made of steel or other hard metal or of some compound which leaves a mark on the dental model at the points of contact. As an example, Fig. 3 of the drawing shows three analyzing pins; it will be within the spirit of my invention to provide only one, or any number of analyzing pins, in conjunction with a Lucite element.

The analyzing pin holder 6 has a cavity containing an electric lamp, preferably of the low voltage type, designated by the numeral 9. Carried by said analyzing pin holder 6 is a Lucite element 10, adapted to be illuminated by said lamp 9 so as to produce a screen of diffused light adjacent to the analyzing pin when latter is in the operating position. This Lucite element is rotatable so that the light screen may be directed to any of the analyzing pins carried by the holder 6, and it can be secured in position by the screw clamp 11. Another object of the rotatability of the Lucite element 10 is to adjust the position and distance of the light screen with respect to the co-operating analyzing pin. The range of this variation in the distance between the light screen and the analyzing pin is illustrated in Fig. 2 by the full and dotted outlines of the Lucite element. By the word "Lucite" I desire to be understood as including any equivalent material of like properties or which might be used in a similar manner to be illuminated by a lamp so as to produce a screen of diffused light. It will be within the spirit of my invention to use as a light source an electric lamp of high voltage or high frequency supply.

Slidably mounted within said spindle 4 is the tubular switch rod 12, carrying at its upper end the operating knob 13, by which said rod 12 can be raised and lowered conveniently. Said switch rod 12 is made of electrically conductive material and passes through the opening of cap 14, which has a threaded connection with the upper end of the spindle 4. The space within said cap 14 contains resilient and electrically conductive material 15, such as fine metal wire or springs, for maintaining electrical conduction between the switch rod 12 and the spindle 4, also for obtaining resistance against the sliding of the switch rod 12 due to gravity.

Enclosed within said tubular switch rod 12 is an insulated conductor 16, terminating in contact 17, which is insulated from the switch rod, and is adapted to be in contact with the central terminal of the lamp 9 when the switch rod is in its lowest position, and to lose contact when said switch rod is raised. The electric current supplying the lamp 9 is brought in through insulated wires 18 and 19, the former is connected to the switch rod 12 and is at ground potential, the latter is connected to the insulated conductor 16 within said switch rod.

The operation of my invention will be as follows: The dental model, clamped in the customary holder, is placed on the base of the surveyor. The lamp is switched on by the lowering of the switch rod. The required analyzing pin is lowered into the operating position, and secured by the screw clamp. The Lucite element is adjusted so as to give the required screen of diffused light behind the analyzing pin, and secured in position. Then, the analyzing of the dental model can be started. In the different phases of this work different analyzing pins are used, all of which may be carried in reserve by the holder at the lower end of the spindle, ready to be lowered into the operating position. The form of my invention illustrated in Fig. 3 has provision for holding three analyzing pins, the type and form of which depend on the preference of the operator. For example, one of them may be a straight steel pin to be used for analyzing the contour of the teeth, the second may be of steel with a lateral extension for determining the location of a required under-cut on the teeth, the third pin may be a straight lead for marking the extreme contour line of the denture. During the work with the various pins the Lucite element may be adjusted by rotating or vertically sliding it in its socket, so as to obtain the most satisfactory screen of light. As a further convenience, the Lucite element may be easily detached and replaced by another Lucite element formed for the particular condition.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. A dental model surveyor comprising, in combination with a base; a supporting stand, mounted on said base; a sleeve, carried by said stand; a tubular spindle, slidably and rotatably mounted in said sleeve; clamping means for securing said spindle in position in said sleeve; a pin holder, secured to the lower end of said spindle and having a cavity; a multiplicity of analyzing pins, slidably mounted in said pin holder, each having a reserve and an operating position; clamping means for securing said pins in any of the positions; an electric lamp, mounted in the cavity of said pin holder; a Lucite element, rotatably and slidably attached to said pin holder, disposed to be illuminated by said lamp, and adapted to produce a screen of diffused light adjacent to said pins, when said pins are in the operating position; clamping means to secure said Lucite element in position; electrical conducting means within said spindle for supplying said lamp; electrical switching means for controlling the supplying of said lamp, operable at said spindle.

2. In a dental model surveyor, the combination of a spindle; a lamp carried by said spindle; a multiplicity of analyzing pins carried by said spindle, each having two positions, reserve and operating positions; a Lucite element carried by said spindle, being disposed to be illuminated by said lamp, and being adapted to produce a screen of light adjacent to any one of said analyzing pins when said pin is in its operating position.

3. The device of claim 2 in which said Lucite element is rotatably mounted so as to permit the directing of the screen of light toward any of the co-operating analyzing pins.

4. The device of claim 2 in which said Lucite element is rotatably and axially slidably mounted and the surface of the Lucite element, which produces the screen of light, is excentric with respect to the axis of rotation so that by rotating and axially sliding said Lucite element, the distance and the position of the screen of light with respect to the co-operating analyzing pin, may be adjusted.

5. In a dental model surveyor, having a spindle; the combination comprising an analyzing pin, carried by said spindle; a lamp, carried by said spindle; a Lucite element carried by said spindle, and being adapted to receive light from said lamp and to produce a screen of light adjacent to said analyzing pin.

No references cited.